United States Patent
Bradley et al.

(10) Patent No.: US 10,348,339 B2
(45) Date of Patent: Jul. 9, 2019

(54) SWITCHED MULTIPLEXER DEVICE SELECTIVELY CONNECTING MULTIPLE FILTER CIRCUITS TO COMMON NODE FOR CARRIER AGGREGATION

(71) Applicant: Avago Technologies General IP (Singapore) Pte. Ltd., Singapore (SG)

(72) Inventors: Paul Bradley, Los Altos, CA (US); Lueder Elbrecht, Munich (DE); Jeesu Kim, San Ramon, CA (US); Young Kwon, Santa Clara, CA (US); Mohammad Ardehali, Palo Alto, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 114 days.

(21) Appl. No.: 15/338,062

(22) Filed: Oct. 28, 2016

(65) Prior Publication Data
US 2018/0123619 A1  May 3, 2018

(51) Int. Cl.
*H04B 7/005* (2006.01)
*H04B 1/00* (2006.01)
*H04L 5/14* (2006.01)
*H04W 72/04* (2009.01)

(52) U.S. Cl.
CPC ............. *H04B 1/0057* (2013.01); *H04L 5/14* (2013.01); *H04W 72/0453* (2013.01)

(58) Field of Classification Search
CPC ..... H04B 1/0057; H04L 5/14; H04W 72/0453
USPC ........................................................ 370/278
See application file for complete search history.

(56) References Cited

U.S. PATENT DOCUMENTS

| | | | |
|---|---|---|---|
| 2002/0101907 A1* | 8/2002 | Dent | H03F 3/24 375/132 |
| 2007/0190954 A1* | 8/2007 | Murakami | H03H 7/38 455/132 |
| 2011/0018653 A1 | 7/2011 | Bradley et al. | |
| 2014/0313947 A1* | 10/2014 | Ali-Ahmad | H04L 5/18 370/278 |
| 2014/0355497 A1 | 12/2014 | Reiha | |

(Continued)

OTHER PUBLICATIONS

German Office Action dated Mar. 23, 2018 with English Translation.

*Primary Examiner* — Sai Ming Chan

(57) ABSTRACT

A device combines filter circuits to be connected to an antenna, enabling carrier aggregation for wireless communications over multiple RF frequency bands in different operational environments. The device includes first, second and third filter circuits having first, second and third matching networks and one or more first, second and third band pass filters with corresponding passbands, respectively. The device further includes multiple individual matching networks not dedicated to any of the first, second or third filter circuits, and a multi-state switch configured to provide different filter circuit combinations by selectively connecting at least two of the first, second and third filter circuits, respectively, and at least one individual matching network of the multiple matching networks. Each filter circuit combination includes a combined matching network having at least two of the first, second and third matching networks and the at least one individual matching network.

19 Claims, 3 Drawing Sheets

(56) References Cited

U.S. PATENT DOCUMENTS

2015/0018043 A1* 1/2015 Taniuchi ............... H03H 7/465
 455/561
2015/0133067 A1* 5/2015 Chang ..................... H04B 1/48
 455/78
2016/0197643 A1 7/2016 Uejima

* cited by examiner

SWITCHED MULTIPLEXER DEVICE SELECTIVELY CONNECTING MULTIPLE FILTER CIRCUITS TO COMMON NODE FOR CARRIER AGGREGATION

BACKGROUND

Devices operating in mobile communication systems, such as cellular telephones and other wireless devices, are configured to communicate over multiple wireless networks. Therefore, different signal paths of a mobile communication device may need to be connected to a common port, such as a common antenna node. For example, a mobile communication device includes a receiver and a transmitter that are typically connected to a common antenna through the common antenna node, for sending and receiving signals over the wireless network. The signal paths must be isolated from one another, and therefore include radio frequency (RF) filter circuits formed by one or more band pass filters that have passbands corresponding to the RF frequency bands of the respective signal paths.

For example, a duplexer is formed by two filter circuits and accommodates two signal paths (e.g., a receive path from a common antenna to a receiver and a transmit path from a transmitter to the common antenna). Each of the filter circuits is a band pass filter. Accordingly, the receiver is able to receive signals through a receive frequency passband, and the transmitter is able to send transmit signals through a different transmit frequency passband, while filtering out the other frequencies. More generally, a multiplexer has multiple (two or more) filter circuits and signal paths connected to a common port with corresponding filter circuits, each formed by one or multiple band pass filters.

The receive and transmit signals may be RF signals corresponding to various predetermined wireless communication standards, such as such as universal mobile telecommunications system (UMTS), global system for mobile communication (GSM), wideband code division multiple access (WCDMA), Long-Term Evolution (LTE) and LTE-Advanced, for example. The communication standards identify separate bands for transmitting and receiving signals. For example, LTE is allocated various 3GPP bands, including bands 1, 3, 7 and 41. Band 1 provides a transmit (uplink) frequency band of 1920 MHz-1980 MHz and a receive (downlink) frequency band of 2110 MHz-2170 MHz, band 7 provides a transmit frequency band of 2500 MHz-2700 MHz and a receive frequency band of 2620 MHz-2690 MHz, and band 41 provides a transmit/receive frequency band of 2496 GHz-2690 GHz. Accordingly, a multiplexer operating in compliance with a 3GPP standard would include filters having passbands within the corresponding transmit and receive frequency bands.

Bands supported with simultaneous operation may be referred to as carrier aggregation. LTE-Advanced, for example, offers higher data rates over the initial releases of LTE. To achieve these higher data rates, LTE-Advanced increases the transmission bandwidths over those that can be supported by a single carrier through carrier aggregation. Generally, carrier aggregation utilizes more than one carrier and hence increases the overall transmission bandwidth.

As the number of possible combinations of bands supported with simultaneous operation grows, it becomes more difficult to support all possible combinations with fixed multiplexers. To do so would require using multiple copies of some filter circuits, each multiplexed with some required combination of other aggregated bands. For example, one location (e.g., North America) and/or service provider may require band 41 to be multiplexed with band 25, while another location (e.g., China) and/or service provider may require band 41 to be multiplexed with bands 1 and 3. Since band 25 collides with band 3, a single multiplexer with all these bands (i.e., bands 1, 3, 25 and 41) is not possible. So, for a conventional mobile device to be able to accommodate both arrangements, there would have to be two different multiplexers with two copies of the band 41 filter included in the mobile device. This adds cost and increases area/size of the mobile device, both of which are undesirable consequences of carrier aggregation.

In RF communications, use of a common antenna requires matching a common antenna node (or terminal) to respective nodes (or terminal) of the multiple signal paths in their respective passbands to optimize signal transfer. This matching requirement drives the need for a combined matching network at the common antenna node that connects the filters associated with the different frequency bands for carrier aggregation.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
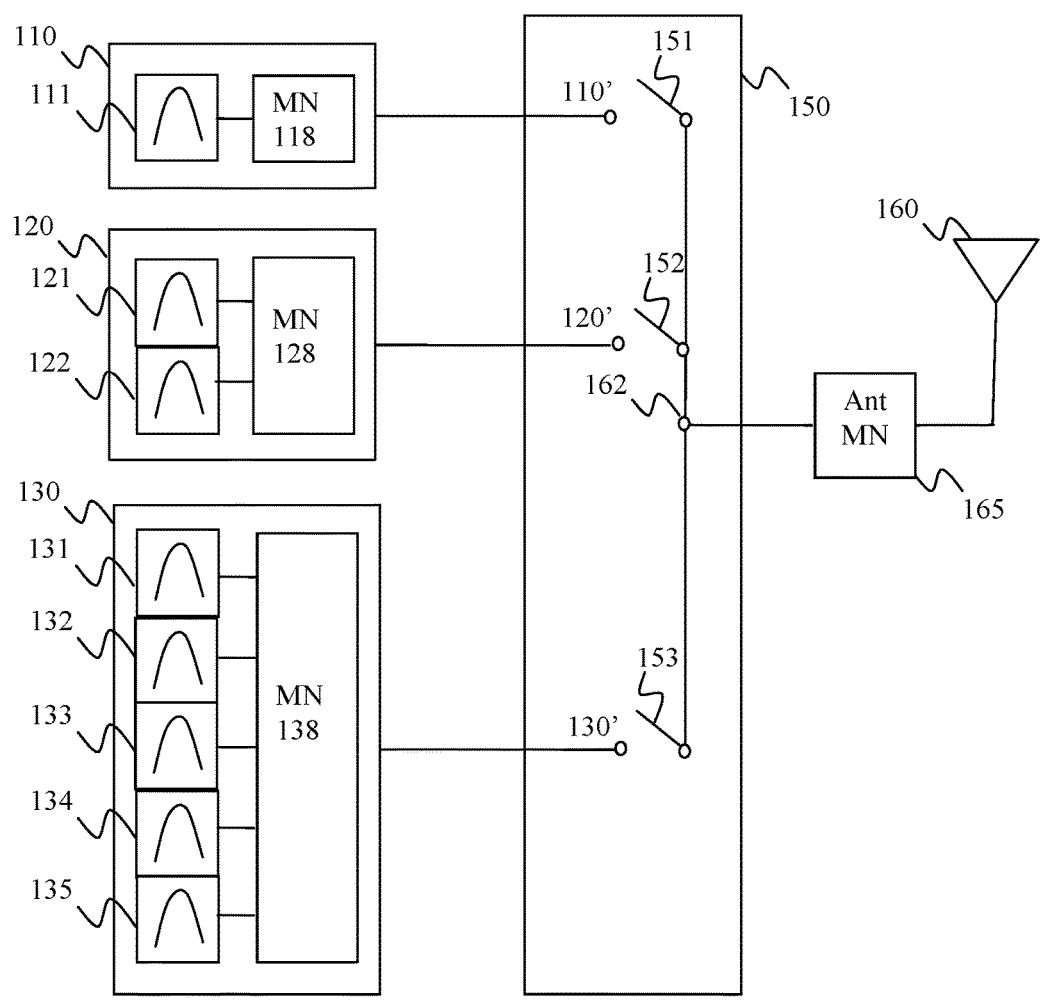
FIG. 1 is a simplified block diagram of a switched multiplexer device for selectively connecting combinations of filters to a common port to provide carrier aggregation of multiple wireless carriers, according to a representative embodiment.

It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a", "an" and "the" include both singular and plural referents, unless the context clearly dictates otherwise. Thus, for example, "a device" includes one device and plural devices. As used in the specification and appended claims, and in addition to their ordinary meanings, the terms "substantial" or "substantially" mean to within acceptable limits or degree. For example, "substantially cancelled" means that one skilled in the art would consider the cancellation to be acceptable. As used in the specification and the appended claims and in addition to its ordinary meaning, the term "approximately" or "about" means to within an acceptable limit or amount to one of ordinary skill in the art. For example, "approximately the same" means that one of ordinary skill in the art would consider the items being compared to be the same.

In the following detailed description, for purposes of explanation and not limitation, specific details are set forth in order to provide a thorough understanding of illustrative embodiments according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the illustrative embodiments. Such methods and apparatuses are clearly within the scope of the present teachings.

Generally, it is understood that the drawings and the various elements depicted therein are not drawn to scale. Further, relative terms, such as "above," "below," "top," "bottom," "upper" and "lower" are used to describe the various elements' relationships to one another, as illustrated in the accompanying drawings. It is understood that these relative terms are intended to encompass different orientations of the device and/or elements in addition to the orientation depicted in the drawings. For example, if the device were inverted with respect to the view in the drawings, an element described as "above" another element, for example, would now be below that element.

Generally, according to various embodiments, a switched multiplexer, "switchplexer," has only one copy of each filter, but disconnects unwanted (band pass) filters as necessary, while connecting filters that are needed using a switch, thus providing the flexibility to switch in or out different band combinations in a mobile device. It is necessary to ensure that out-of-band impedance of any missing filter is replaced, either by a replacement filter or a switched in low Q reactive circuit to ensure proper impedance matching of the remaining filters at the common port (e.g., common antenna node).

FIG. 1 is a simplified block diagram of a switched multiplexer device for selectively connecting combinations of filters to a common port to provide carrier aggregation, according to a representative embodiment. The selective connection of the combinations of filters to the common port (e.g., a common antenna node) enables simultaneous wireless communications over multiple predetermined bands in different operational environments.

Referring to FIG. 1, switched multiplexer device 100 for combining filter circuits includes a multi-state switch 150, which selectively connects two or more of first filter circuit 110, second filter circuit 120 and third filter circuit 130 to a common antenna node 162 by selective operation (closing and opening) of switches 151, 152 and 153, respectively. The switched multiplexer device 100 (as well as the switched multiplexer devices 200 and 300, discussed below) thereby provides carrier aggregation. That is, the switched multiplexer device 100 has a single state, after operational configuration of the multi-state switch 150 (which is configured to produce one or more different states comprising different filter circuit combinations), and operates as a single multiplexer in the case of carrier aggregation. Otherwise, the system would consist of a switching matrix and N multiplexers, where the system has N different states and operates as N different multiplexers.

The common antenna node 162 is connected antenna 160 through antenna matching network 165. Although the connection between the common antenna node 162 and the antenna 160 is shown as a fixed connection, it is understood that the common antenna node 162 and the antenna 160 may be selectively connected via an antenna switch (not shown), without departing from the scope of the present teachings. In the depicted example, the multi-state switch 150 is single-pole, multi-throw switch (i.e., three-throw switch), for purposes of illustration. Of course, additional and/or different filter circuits may be included in the switched multiplexer device 100 without departing from the scope of the present teachings.

Depending on implementation, each of the first filter circuit 110, second filter circuit 120 and third filter circuit 130 is connected to a transmitter, a receiver or both. That is, each of the first filter circuit 110, the second filter circuit 120 and the third filter circuit 130 may be in a transmit signal path for passing filtered signals from a transmitter (not shown) to the common antenna node 162, a receive signal path for passing filtered signals from the common antenna node 162 to a receiver (not shown), or a time division duplex (TDD) signal path capable of transmitting and receiving.

The illustrative first filter circuit 110 includes a first band pass filter 111 having a corresponding passband, and a first matching network 118. The first matching network 118 may be referred to as a local matching network of the first filter circuit 110. The first band pass filter 111 provides a transmit and/or receive passband for the particular LTE band (e.g., band 41) accommodated by the first filter circuit 110. For example, the first band pass filter 111 may provide a passband for both transmitting and receiving band 41 signals, although other frequency bands (for transmitting and/or receiving) may be incorporated without departing from the scope of the present teachings.

The first band pass filter 111 may be an acoustic filter, for example, comprising multiple acoustic resonators, such as bulk acoustic wave (BAW) resonators. Examples of BAW resonators used for filtering transmitted and received RF signals include thin film bulk acoustic resonators (FBARs) and solidly mounted resonators (SMRs). In an embodiment, the first band pass filter 111 (as well as other band pass filters discussed herein) may be a ladder filter comprising multiple series connected BAW resonators and multiple shunt connected BAW resonators, the number, arrangement and characteristics of which are determined with respect to the desired passband (e.g., corresponding to desired LTE frequency band in use), as would be apparent to one skilled in the art. Examples of ladder filters are described by Bradley et al. in U.S. Patent App. Pub. No. 2011/0018653 (published Jan. 27, 2011), which is hereby incorporated by reference in its entirety.

The first matching network 118 provides impedance matching between the first band pass filter 111 and the antenna 160 at the common antenna node 162. The first matching network 118 may include one or more series inductors connected between the first band pass filter 111 and corresponding switch terminal 110', and/or one or more shunt inductors connected between the first band pass filter 111 and ground, in order to alter input impedance of the first band pass filter 111 to match the input impedance of the common antenna node 162. Each shunt inductor in particular may have a first terminal connected between the first band pass filter 111 and the switch terminal 110' and a second terminal connected to ground. Alternatively, or in addition, the first matching network 118 may include one or more series capacitors connected between the first band pass filter 111 and corresponding switch terminal 110', and/or one or more shunt capacitors connected between the first band pass filter 111 and ground, in order to alter input impedance of the first band pass filter 111 to match the input impedance of the common antenna node 162. Each shunt capacitor in particular may have a first terminal connected between the first band pass filter 111 and the switch terminal 110' and a second terminal connected to ground. It is understood that the first matching network 118 is not limited to only inductors or capacitors, but rather may include a combination of both in an inductor-capacitor (LC) circuit to provide the appropriate impedance matching.

The antenna matching network 165 provides impedance matching between the antenna 160 and the common antenna node 162. As discussed above with regard to the first matching network 118, the antenna matching network 165 may include various combinations of series and shunt inductors, series and shunt capacitors and/or LC circuits having both inductors and capacitors. The antenna matching network 165 may also factor into determination of the combined matching network (provided by the first matching network 118, along with a second matching network 128 of the second filter circuit 120 and a third matching network 138 of the third filter circuit 130, discussed below) to match impedance at the common antenna node 162. That is, the antenna matching network 165 may provide additional impedance matching, as needed. Of course, with regard to the first matching network 118 (as well as the second and third matching networks 128 and 138, discussed below) and the antenna matching network 165, the electronic components and configurations may vary to provide unique benefits for any particular situation or to meet application specific design requirements of various implementations, as would be apparent to one skilled in the art.

It is understood that the first matching network 118 is not limited to series and shunt inductors, but rather may include series and/or shunt capacitors, or an inductor-capacitor (LC) circuit comprising both inductors and capacitors, to provide impedance and/or phase matching.

The illustrative second filter circuit 120 is a duplexer, which includes second band pass filters 121 and 122 having corresponding passbands, and a second matching network 128 shared by the second band pass filters 121 and 122. The second matching network 128 may be referred to as a local matching network of the second filter circuit 120. The second matching network 128 is connected between the second band pass filters 121-122 and corresponding switch terminal 120'. The second band pass filters 121 and 122 may be acoustic filters, for example, comprising multiple acoustic resonators, such as BAW resonators, as discussed above with reference to the first band pass filter 111. The two second band pass filters 121 and 122 provide a transmit passband and a receive passband, respectively, for the particular LTE band (e.g., band 7) accommodated by the second filter circuit 120. For example, the second filter 121 may provide a transmit passband for band 7 and the second filter 122 may provide a receive passband for band 7, although other frequency bands may be incorporated without departing from the scope of the present teachings. Accordingly, the second matching network 128 provides impedance matching between one or more of the second band pass filters 121 and 122 with the antenna 160 at the common antenna node 162. This enables simultaneous use of multiple passbands impedance matched with the antenna 160.

The second matching network 128 also causes the input impedance of the second band pass filter 121 or 122 not impedance matched to the antenna 160 to appear as an open circuit in the passband the other second band pass filter 121 or 122 that is impedance matched to the antenna 160. Generally, band pass filters electrically appear to be capacitors. Therefore, for example, when the second band pass filter 121 is in use (e.g., for transmission of an RF signal in band 7), such that the input impedance of the second band pass filter 121 is being matched to the input impedance of the antenna 160, the second matching network 128 also provides an inductance that substantially offsets the capacitance of the second band pass filter 122. Accordingly, the second band pass filter 122 appears as an open circuit within the passband of the second band pass filter 121.

The illustrative third filter circuit 130 in FIG. 1 is a quintplexer, which includes five third second band pass filters 131 to 135 having corresponding passbands, and a third matching network 138 shared by the third band pass filters 131 to 135. The third matching network 138 may be referred to as a local matching network of the third filter circuit 130. The third matching network 138 is connected between the third band pass filters 131-135 and corresponding switch terminal 130'. Notably, each of the second filter circuit 120 (a duplexer) and the third filter circuit 130 (a quintplexer) may be referred to generally as a multiplexer. The third band pass filters 131 to 135 may be acoustic filters, for example, comprising multiple acoustic resonators, such as BAW resonators, as discussed above with reference to the first band pass filter 111. The third band pass filters 131 to 135 provide various transmit and/or receive passbands, respectively, for the particular LTE bands (e.g., bands 1, 3, 4 and 40) accommodated by the third filter circuit 130. For example, the third band pass filter 131 may provide a transmit passband for bands 3 and 4, the third band pass filter 132 may provide a transmit passband for band 1, the third band pass filter 133 may provide a transmit passband for bands 1 and 4, the third band pass filter 134 may provide a receive passband for band 4, and the third band pass filter 135 may provide a transmit and receive passband for band 40, although other frequency bands may be incorporated without departing from the scope of the present teachings. Accordingly, the third matching network 138 provides impedance matching between one or more of the third band pass filters 131, 132, 133, 134 or 135 and the antenna 160 at the common antenna node 162. This enables simultaneous use of multiple passbands impedance matched with the antenna 160. Of course, with regard to the first through third filter circuits 110, 120 and 130, the frequency bands and the arrangements of the filter circuits may vary to provide unique benefits for any particular situation or to meet application specific design requirements of various implementations, as would be apparent to one skilled in the art.

The third matching network 138 also causes the input impedances of the third band pass filters 131, 132, 133, 134 and 135 not impedance matched with the antenna 160 to appear as open circuits in the passband the one of the third band pass filters 131, 132, 133, 134 or 135 that is impedance matched to the antenna 160. Therefore, for example, when the third band pass filter 131 is in use (e.g., for transmission of an RF signal in band 3 or band 4), such that the input impedance of the third band pass filter 131 is being matched to the input impedance of the antenna 160, the third matching network 138 also provides inductances that substantially offset the capacitances of the third band pass filters 132, 133, 134 and 135. Accordingly, the third band pass filters 132, 133, 134 and 135 appear as open circuits within the passband of the third band pass filter 131.

In addition, one or more of the first, second and third matching networks 118, 128 and 138 further includes electrical circuitry to enable a combined matching network that provides cross-over impedance matching for any of the various combinations of the first, second and third filter circuits 110, 120 and 130 (enabled by operation of the multi-state switch 150). That is, depending on what bands may be in simultaneous use, the multi-state switch 150 may connect the common antenna node 162 to one of the first, second and third filter circuits 110, 120 and 130 (which would require no carrier aggregation), to a combination of the first and second filter circuits 110 and 120, to a combination of the first and third filter circuits 110 and 130, to a combination of the second and third filter circuits 120 and 130, or to a combination of the first, second and third filter circuits 110, 120 and 130. Each of the possible arrangements presents a different input impedance, as seen from the common antenna node 162, subject to matching.

For example, when all of the first, second and third matching networks 118, 128 and 138 are connected to the common antenna node 162 to accommodate simultaneous communication over the multiple LTE bands using the single antenna 160, the collective first, second and third matching networks 118, 128 and 138 not only provide impedance matching between the selected first band pass filter 111, second band pass filters 121-122 and/or third band pass filters 131-135 and the common antenna node 162, but also electrically remove the other band pass filters from among the first band pass filter 111, the second band pass filters 121-122 and the third band pass filters 131-135 by making them appear as open circuits in the passband of the selected first band pass filter 111, second band pass filters 121-122 and/or third band pass filters 131-135. That is, the total combined circuitry of the connected first, second and third matching networks 118, 128 and 138 (as well as the antenna matching network 165) is used to make the total impedance of all the undesired band pass filters go as near open circuit as possible.

In various embodiments, the determination and/or execution of which of the first, second and third filter circuits 110, 120 and 130 are selectively connected to the common antenna node 162 is performed by a processing unit (not shown), such as processor in the cellular telephone or other mobile device containing the switched multiplexer device 100. The processing unit may be implemented by a computer processor, field-programmable gate arrays (FPGAs), application specific integrated circuits (ASICs), using software, firmware, hard-wired logic circuits, or combinations thereof. A computer processor, in particular, may be constructed of any combination of hardware, firmware or software architectures, and may include its own memory (e.g., nonvolatile memory) for storing executable software and/or firmware executable code that allows it to perform the various functions. In an embodiment, the computer processor may comprise a central processing unit (CPU), for example, executing an operating system. A memory (not shown) may be implemented by any number, type and combination of random access memory (RAM) and read-only memory (ROM), for example, and may store various types of information, such as computer programs and software algorithms executable by the computer processor (and/or other components), including the switch configurations for given combinations of required bands. The various types of ROM and RAM may include any number, type and combination of computer readable storage media, such as a disk drive, an electrically programmable read-only memory (EPROM), an electrically erasable and programmable read only memory (EEPROM), a CD, a DVD, a universal serial bus (USB) drive, and the like, which are non-transitory (e.g., as compared to transitory propagating signals).

Providing a suitable design for the first, second and third matching networks 118, 128 and 138 and the antenna matching network 165 involves a trial and error approach. For example, a heuristic method may be used to initially design the matching networks to provide substantial impedance matching among the various combinations of band pass filters 111, 121-122 and 131-135 and the common antenna node 162. Then, the initial design may be optimized (e.g., to lower insertion loss) using a circuit simulator, for example. Although there are numerous possible designs for the first, second and third matching networks 118, 128 and 138 and the antenna matching network 165, the simplest design with the lowest insertion loss that adequately provides good return loss on all of the band pass filters connected at one time for all required filter combinations is implemented.

Due to the potentially large number of different band pass filter combinations, and the complexity of designing for cross-over impedance matching among these band pass filters for each of the combinations using only the first, second and third matching networks 118, 128 and 138, it is useful to have available individual matching networks that may be selectively switched in and out of a combined matching network.

Figure 2:
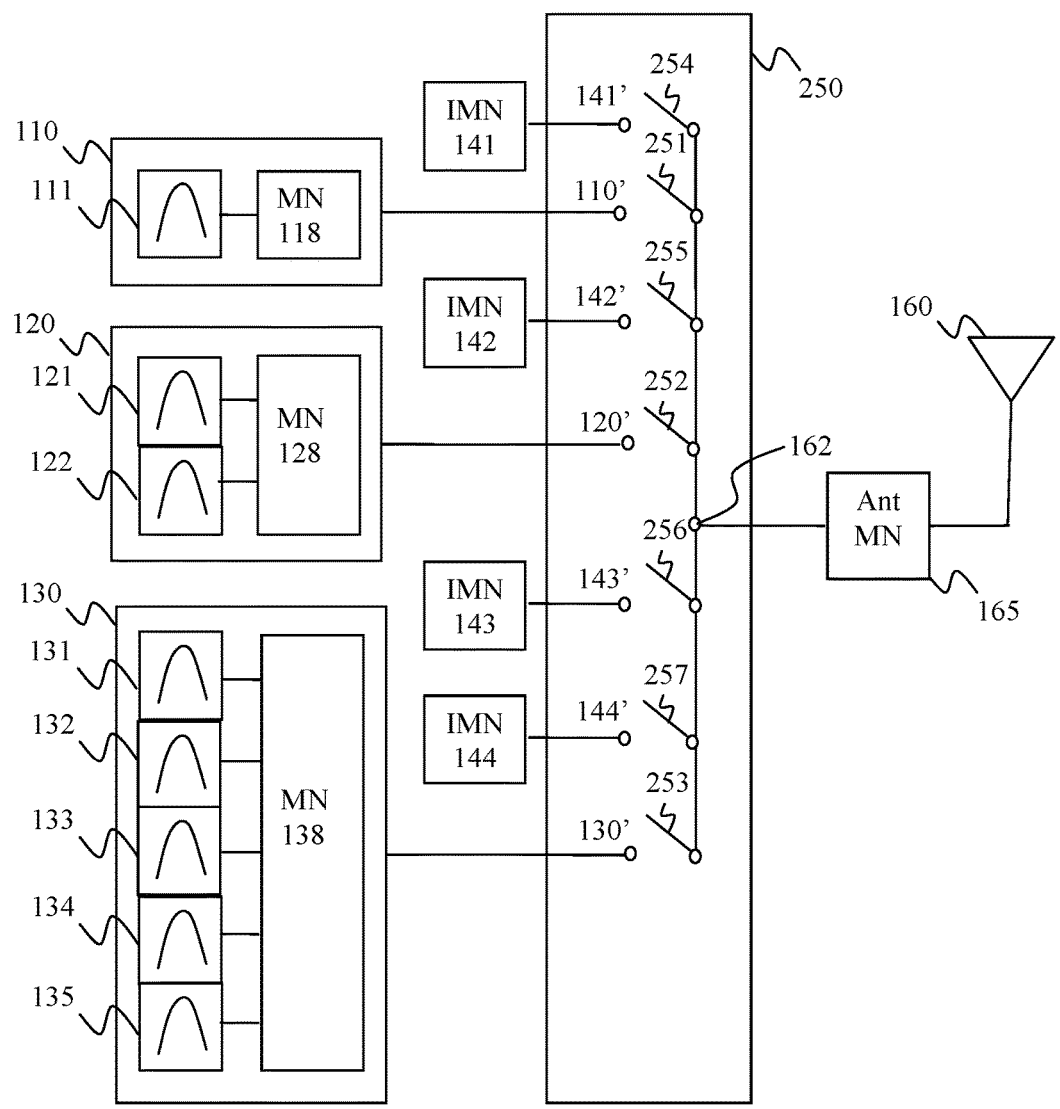
FIG. 2 is a simplified block diagram of a switched multiplexer device for selectively connecting combinations of filters and isolated matching networks to a common port to provide carrier aggregation of multiple wireless carriers, according to a representative embodiment.

FIG. 2 is a simplified block diagram of a switched multiplexer device for selectively connecting combinations of filters and individual matching networks to a common port to provide carrier aggregation, according to a representative embodiment.

Referring to FIG. 2, switched multiplexer device 200 for combining filter circuits includes a multi-state switch 250, which selectively connects at least two of the first filter circuit 110, the second filter circuit 120 and the third filter circuit 130, and at least one of individual matching networks (IMNs) 141, 142, 143 and 144, to a common antenna node 162 by selective operation of switches 251, 252, 253 and switches 254, 255, 256, 257, respectively. The individual matching networks 141, 142, 143 and 144 (which may be referred to as low Q reactive circuits) are connected to corresponding switch terminals 141', 142', 143' and 144', respectively. In the depicted example, the multi-state switch 250 is single-pole, multi-throw switch (i.e., seven-throw switch), to enable simultaneous connections between the common antenna node 162 and one or more of the first through third filter circuits 110, 120 and 130 and the individual matching networks 141-144.

The common antenna node 162 is connected antenna 160 through antenna matching network 165. Although the connection between the common antenna node 162 and the antenna 160 is shown as a fixed connection, it is understood that the common antenna node 162 and the antenna 160 may be selectively connected via an antenna switch (not shown), without departing from the scope of the present teachings. The first through third filter circuits 110, 120 and 130 are substantially the same as discussed above with reference to FIG. 1 (with some potential variations in the configurations of the first through third matching networks 118, 128 and 138 due to the presence of the selectable individual matching networks 141-144), and therefore the descriptions will not be repeated. Of course, additional and/or different filter circuits and individual matching networks may be included in the switched multiplexer device 200 without departing from the scope of the present teachings.

As discussed above, the matching requirements are different for the band pass filters corresponding to the various bands, as well as the number and type (e.g., receive, transmit, transmit/receive) of band pass filters in the filter circuits. Therefore, the matching networks differ depending on which filter circuits are connected to the common antenna node 162 by operation of the multi-state switch 250. The first through third matching networks 118, 128 and 138 corresponding to the first through third filter circuits 110, 120 and 130, respectively, may not provide acceptable matching once two or more first through third filter circuits 110, 120 and 130 are combined (even with the heuristic-based design of the first through third matching networks 118, 128 and 138 to provide substantial impedance matching for combined matching networks among the various possible combinations of band pass filters and the common antenna node 162, discussed above).

Thus, in order to (further) adjust the impedance phase matching of the connected combinations of the first through third filter circuits 110, 120 and 130, the individual matching networks 141-144 may be selectively implemented through operation of the multi-state switch 250. The individual matching networks 141-144 are not dedicated to any of the first through third filter circuits 110, 120 and 130, but may be inserted in combination with the first through third filter circuits 110, 120 and 130, as needed, to provide impedance matching. That is, one or more of the individual matching networks 141-144 may be selectively connected to complement the local matching networks, first, second and third matching networks 118, 128 and 138, corresponding to the selectively connected first through third filter circuits 110, 120 and 130 to enable the impedance matching. Thus, in various embodiments, each combination of at least two of the first filter circuit 110, the second filter circuit 120 and/or the third filter circuit 130 includes a combined matching network. The combined matching network includes at least two of the first matching network 118, the second matching network 128 and/or the third matching network 138, respectively, of the combined filter circuits, and at least one individual matching network 141, 142, 142 and/or 144.

Each of the individual matching networks 141-144 may consist of a single element, such as a series inductor, a series capacitor, a shunt inductor, a shunt capacitor or a transmission line (e.g., a quarterwave line), or may consist of an LC circuit including both inductors and capacitors. The shunt inductors and/or capacitors may be shunted to ground. These individual matching networks 141-144 can be added, separately, to the first, second and/or third matching networks 118, 128 and/or 138 that are connected to the common antenna node 162, in order to selectively affect the impedance matching characteristics. The ability to selectively add the individual matching networks 141-144 simplifies the combined matching network design process, since the dedicated first, second and third matching networks 118, 128 and 138 do not need to have the flexibility to provide impedance matching for all potential combinations. Rather, individual matching networks 141-144 needed for some combined matching networks, but not other combined matching networks, may be switched in and out by the multi-state switch 250, as needed. The switching operations for connecting/disconnecting the first, second and third filter circuits 110, 120 and 130, as well as the individual matching networks 141-144, based in part on desired combinations of first band pass filter 111, second band pass filters 121-122 and third band pass filters 131-135, and corresponding frequency bands, is controlled by the processing unit, and the switch configurations for given combinations of required bands may be stored in memory accessible by the processing unit, as discussed above, as would be apparent to one skilled in the art.

Figure 3:
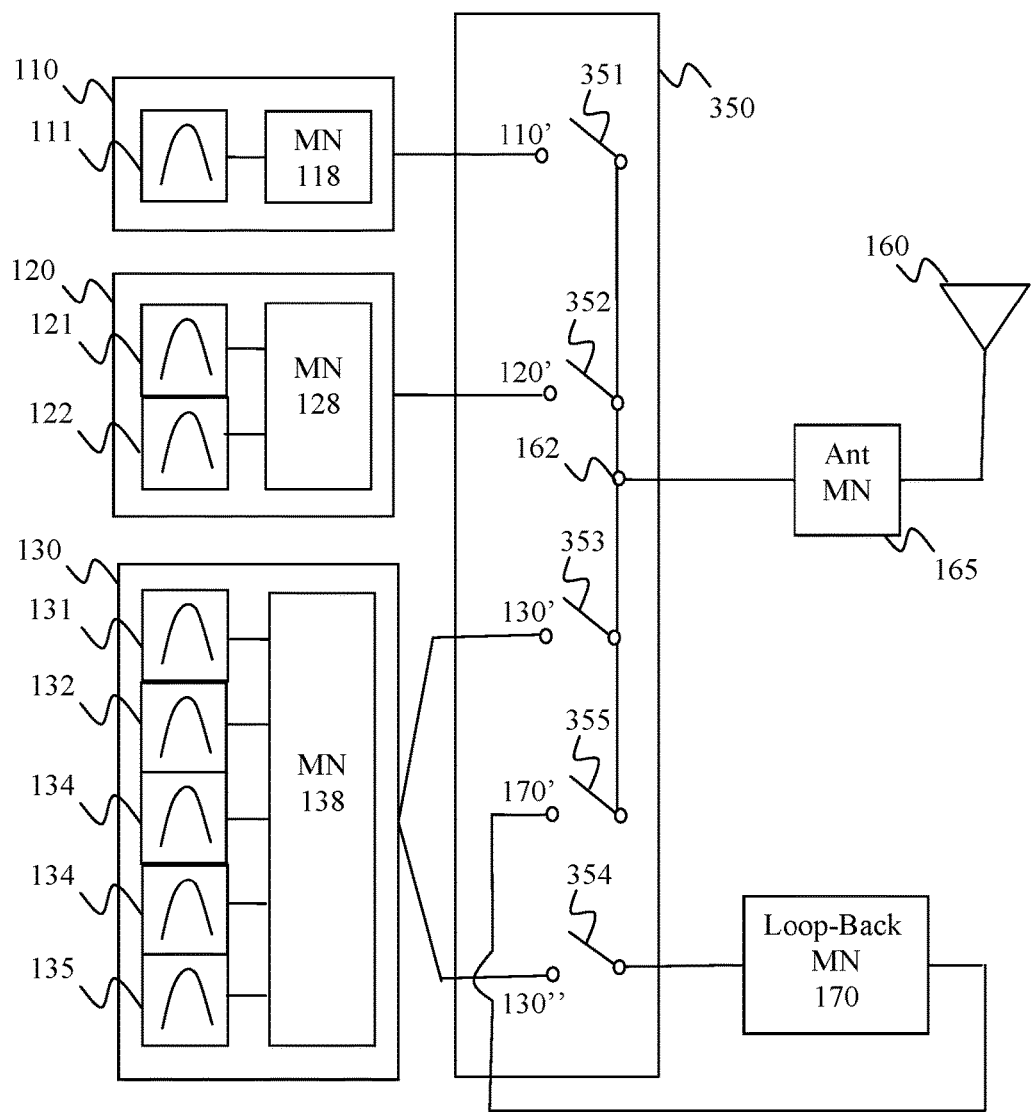
FIG. 3 is a simplified block diagram of a switched multiplexer device for selectively connecting combinations of filters and a loop-back matching network to a common port to provide carrier aggregation of multiple wireless carriers, according to a representative embodiment.

FIG. 3 is a simplified block diagram of a switched multiplexer device for selectively connecting combinations of filters and a loop-back matching network to a common port to provide carrier aggregation, in accordance with carrier aggregation or non-carrier aggregation operations for multiple predetermined bands, according to a representative embodiment.

Referring to FIG. 3, switched multiplexer device 300 for combining filter circuits includes a multi-state switch 350, the first filter circuit 110, the second filter circuit 120, the third filter circuit 130 and a loop-back matching network 170 associated with the third filter circuit 130. The loop-back matching network 170 is on the same side of the multi-state switch 350. Therefore, in the depicted example, the multi-state switch 350 is effectively a combined single-pole, multi-throw switch (i.e., four-throw switch) with regard to the antenna 160, and single-pole, single throw switch with regard to the loop-back matching network 170, to selectively enable simultaneous connections between the common antenna node 162 and one or more of the first through third filter circuits 110, 120 and 130, and between the loop-back matching network 170 and the third filter circuit 130. The multi-state switch 350 selectively connects at least two of the first filter circuit 110, the second filter circuit 120 and the third filter circuit 130 to a common antenna node 162 by selective operation of switches 351, 352, 253 and switches 354, 355, respectively. With regard to the third filter circuit 130, in particular, the multi-state switch 350 may selectively connect the third filter circuit 130 directly to the common antenna node 162 (via switch terminal 130' and closing of switch 353) or indirectly to the common antenna node 162 (via switch terminal 130", closing of switch 354, the loop-back matching network 170, closing of switch 355, and switch terminal 170'), such that the loop-back matching network 170 is connected in series in front of the third filter circuit 130.

The common antenna node 162 is connected antenna 160 through antenna matching network 165. Although the connection between the common antenna node 162 and the antenna 160 is shown as a fixed connection, it is understood that the common antenna node 162 and the antenna 160 may be selectively connected via an antenna switch (not shown), without departing from the scope of the present teachings. The first through third filter circuits 110, 120 and 130 are substantially the same as discussed above with reference to FIG. 1 (with some potential variations in the configurations of the first through third matching networks 118, 128 and 138 due to the presence of the selectable loop-back matching network 170), and therefore the descriptions will not be repeated. Of course, additional and/or different filter circuits and individual matching networks may be included in the switched multiplexer device 300 without departing from the scope of the present teachings.

As discussed above, the matching requirements are different for the band pass filters corresponding to the various bands, as well as the number and type (e.g., receive, transmit, transmit/receive) of band pass filters in the filter circuits. Therefore, the matching networks differ depending on which filter circuits are connected to the common antenna node 162 by operation of the multi-state switch 350. The first through third matching networks 118, 128 and 138 corresponding to the first through third filter circuits 110, 120 and 130, respectively, may not provide acceptable matching once two or more first through third filter circuits 110, 120 and 130 are combined (even with the heuristic-based design of the first through third matching networks 118, 128 and 138 to provide substantial impedance matching for combined matching networks among the various possible combinations of band pass filters and the common antenna node 162, discussed above).

Thus, in order to (further) adjust the impedance phase matching of the connected combinations of the first through third filter circuits 110, 120 and 130, and more particularly, of the third filter circuit 130, the loop-back matching network 170 may be selectively implemented through operation of the multi-state switch 350. That is, the loop-back matching network 170 may be inserted in combination with the third filter circuit 130 (which also affects the combined matching of the first and/or second filter circuits 110 and/or 120), as needed, to provide impedance matching. As shown in FIG. 3, the third filter circuit 130 may be directly connected to the common antenna node 162 through the switch terminal 130' (by-passing the loop-back matching network 170). Or, the third filter circuit 130 may be in directly connected to the common antenna node 162 through the switch terminal 130" (connecting the third filter circuit 130 to the loop-back matching network 170), the circuitry of the loop-back matching network 170, and the switch terminal 170' (connecting the loop-back matching network 170 to the common antenna node 162), thereby incorporating the impedance matching characteristics of the loop-back matching network 170 with the impedance matching characteristics of the third matching network 138, as well as the first and/or second matching networks 118 and/or 128, to provide the combined matching network. The combined matching network includes at least two of the first matching network 118, the second matching network 128, the third matching network 138 and/or the loop-back matching network 170.

The loop-back matching network 170 may include one or more series inductors connected between the third filter circuit 130 and switch terminal 170', and/or one or more shunt inductors connected between the third filter circuit 130 and ground, in order to alter input impedance of the third filter circuit 130. Alternatively, or in addition, the loop-back matching network 170 may include one or more series capacitors connected between the third filter circuit 130 and the switch terminal 170', and/or one or more shunt capacitors connected between the third filter circuit 130 and ground, in order to alter input impedance of the third filter circuit 130. It is understood that the loop-back matching network 170 is not limited to only inductors or capacitors, but rather may include a combination of both in an LC circuit to provide the appropriate impedance matching. In an embodiment, the loop-back matching network 170 may be a phase-shifter.

An advantage of locating the loop-back matching network 170 on the opposite side of the multi-state switch 350 from the third filter circuit 130 is that loss introduced by the loop-back matching network 170 (e.g., insertion loss) is not present when the loop-back matching network 170 is not switched into the circuit along with the third filter circuit 130. So, for example, in the case of non-carrier aggregation operation, e.g., when the third filter circuit 130 is the only filter circuit connected to the common antenna node 162, the switches 354 and 355 are opened, and the switch 353 is closed, thereby bypassing the loop-back matching network 170. The insertion loss is therefore reduced in the non-carrier aggregation operation (as compared to selectively connecting the third filter circuit 130 to the common antenna node 162 with the loop-back matching network 170). This is particularly advantageous where low, non-carrier aggregation insertion loss has high priority. In contrast, during carrier aggregation operation, the insertion loss of the multi-state switch 350 loss is incurred twice, as well as the additional insertion loss of the loop-back matching network 170, which is typically an acceptable tradeoff when non-carrier aggregation insertion loss is the priority.

With regard to carrier aggregation operation, the loop-back matching network 170 can be added to the third matching network 138 and connected to the common antenna node 162 in order to selectively affect the impedance matching characteristics. The ability to selectively add the loop-back matching network 170 simplifies the combined matching network design process, since the dedicated first, second and third matching networks 118, 128 and 138 do not need to have the flexibility to provide impedance matching for all potential combinations. Rather, the loop-back matching network 170 would be needed for some combined matching networks, but not other combined matching networks, and may be switched in and out by the multi-state switch 350, as needed. The switching operations for connecting/disconnecting the first, second and third filter circuits 110, 120 and 130, as well as the loop-back matching network 170, based in part on desired combinations of first band pass filter 111, second band pass filters 121-122 and third band pass filters 131-135, and corresponding frequency bands, is controlled by the processing unit, and the switch configurations for given combinations of required bands may be stored in memory accessible by the processing unit, as discussed above, as would be apparent to one skilled in the art.

In an embodiment, a switched multiplexer device may include both individual matching networks (e.g., individual matching networks 141, 142, 143 and 144) and one or more loop-back matching networks (e.g. loop-back matching network 170). Such arrangements would further increase flexibility in designing and implementing combined impedance matching circuits for matching impedances between at least two of the first, second and third filter circuits 110, 120 and 130 and the common antenna node 162.

It is understood that various alternative embodiments may include different numbers of filter circuits, individual matching networks and/or loop-back matching networks, without departing from the scope of the present teachings. Likewise, the first band pass filter, the second band pass filters and/or the third band pass filters may have respective passbands directed to other frequency ranges (e.g., other than those corresponding to LTE bands 1, 3, 4, 7, 40 and 41), without departing from the scope of the present teachings. Further, in the depicted embodiments, each of the passbands of the second band pass filters 121-122 are non-overlapping, and each of the passbands of the third band pass filters 131-135 are likewise non-overlapping. Also, the passbands of the third band pass filters 131-135 are different from the passbands of the second band pass filters 121-122, which are different from the passband of the first band pass filter 111.

The various components, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

The invention claimed is:

1. A device for combining filter circuits to be connected to a radio frequency (RF) antenna, enabling simultaneous wireless communications over a plurality of predetermined bands in a plurality of different operational environments, the device comprising:
   a first filter circuit comprising a first matching network and one or more first band pass filters with corresponding passbands;

a second filter circuit comprising a second matching network and one or more second band pass filters with corresponding passbands, the passbands of the one or more second band pass filters being different from the passbands of the one or more first band pass filters, respectively;

a third filter circuit comprising a third matching network and one or more third band pass filters with corresponding passbands, the passbands of the one or more third band pass filters being different from the passbands of the one or more first band pass filters and the one or more second band pass filters, respectively;

a plurality of individual matching networks not dedicated to any of the first filter circuit, the second filter circuit or the third filter circuit;

a multi-state switch configured to provide different filter circuit combinations by selectively connecting at least two of the first filter circuit, the second filter circuit and the third filter circuit, respectively, and at least one individual matching network of the plurality of individual matching networks; and an antenna matching network connected between the multi-state switch and the RF antenna, wherein each filter circuit combination includes a combined matching network comprising at least two of the first matching network, the second matching network and the third matching network in the selectively connected at least two of the first filter circuit, the second filter circuit and the third filter circuit, respectively, and the at least one individual matching network.

2. The device of claim 1, wherein the plurality of predetermined bands comprise LTE bands.

3. The device of claim 1, wherein the first filter circuit comprises a single band pass filter having a first passband corresponding to a transmit frequency band or a receive frequency band of a first predetermined band.

4. The device of claim 3, wherein the second filter circuit comprises a duplexer having a set of second passbands corresponding to a transmit frequency band and a receive frequency band of a second predetermined band.

5. The device of claim 4, wherein the third filter circuit comprises a multiplexer having a set of third passbands corresponding to a transmit frequency band and a receive frequency band of a third predetermined band and another set of third passbands corresponding to a transmit frequency band and a receive frequency band of a fourth predetermined band.

6. The device of claim 1, wherein at least one of the individual matching networks comprises a single shunt inductor or a single shunt capacitor connected to ground.

7. The device of claim 1, wherein at least one of the individual matching networks comprises a single series inductor.

8. The device of claim 1, wherein at least one of the individual matching networks comprises an LC circuit having at least one inductor and at least one capacitor.

9. A wireless communication device for receiving and/or transmitting radio frequency (RF) wireless signals via a plurality of wireless carriers, in accordance with carrier aggregation or non-carrier aggregation operations for a plurality of predetermined bands, the wireless communication device comprising:

an antenna connected to a common antenna node;
a first filter circuit comprising a first matching network and one or more first band pass filters with corresponding passbands;

a second filter circuit comprising a second matching network and two or more second band pass filters with corresponding passbands, the passbands of the two or more second band pass filters being different from the passbands of the one or more first band pass filters, respectively; and a loop-back matching network associated with the second filter circuit; and a multi-state switch configured to produce at least two different states comprising different filter circuit combinations by (i) selectively connecting the first filter circuit to the common antenna node, (ii) selectively connecting the second filter circuit to the common antenna node or to the loop-back matching network, and/or (iii) selectively connecting the loop-back matching network to the common antenna node and the second filter circuit, wherein each filter circuit combination includes a combined matching network comprising at least one of the first matching network, the second matching network and the loop-back matching network.

10. The wireless communication device of claim 9, wherein not connecting the loop-back matching network reduces insertion loss during non-carrier aggregation operation, as compared to selectively connecting the second filter circuit to the common antenna node with the loop-back matching network.

11. The wireless communication device of claim 9, further comprising:

a third filter circuit comprising a third matching network and two or more third band pass filters with corresponding passbands, the passbands of the two or more third band pass filters being different from the passbands of the one or more first band pass filters and the two or more second band pass filters, respectively; and an additional loop-back matching network associated with the third filter circuit, wherein the multi-state switch is further configured to produce at least two different states comprising different filter circuit combinations by (i) selectively connecting the first filter circuit to the common antenna node, (ii) selectively connecting the second filter circuit to the common antenna node or to the loop-back matching network and the loop-back matching network to the common antenna node, (iii) selectively connecting the third filter circuit to the common antenna node or to the additional loop-back matching network, (iv) selectively connecting the loop-back matching network to the common antenna node and the second filter circuit, and/or (v) selectively connecting the additional loop-back matching network to the common antenna node and the third filter circuit, and wherein each filter circuit combination includes a combined matching network comprising at least one of the first matching network, the second matching network and the loop-back matching network and the third matching network and the additional loop-back matching network.

12. A wireless communication device for receiving and/or transmitting radio frequency (RF) wireless signals via a plurality of wireless carriers in accordance with carrier aggregation operation for a plurality of predetermined bands, the wireless communication device comprising:

an antenna connected to a common antenna node via an antenna matching network;
a plurality of filter circuits comprising corresponding band pass filters, respectively;

a plurality of individual matching networks; and a multi-state switch configured to selectively connect at least two filter circuits of the plurality of filter circuits and at least one individual matching network of the plurality of individual matching networks to the common antenna node, in response to an operational environment, wherein the at least one individual matching network is selected to enable impedance matching among the connected at least two filter circuits and the common antenna node.

13. The wireless communication device of claim 12, wherein each filter circuit of the plurality of filter circuits further comprises a corresponding local matching network.

14. The wireless communication device of claim 13, wherein the selected at least one individual matching network complements the local matching networks corresponding to the selectively connected at least two filter circuits to enable the impedance matching among the connected at least two filter circuits.

15. The wireless communication device of claim 12, wherein the plurality of filter circuits includes a multiplexer having at least two band pass filters with corresponding passbands, the passbands comprising a transmit frequency band and a receive frequency band corresponding to a predetermined communications band.

16. The wireless communication device of claim 15, further comprising:

a loop-back matching network selectively connectable to the multiplexer through the multi-state switch to be connected in series in front of the multiplexer, and selectively connectable to the common antenna node through the multi-state switch.

17. The wireless communication device of claim 12, wherein the selected at least one individual matching network comprises at least one of a shunt inductor and a shunt capacitor.

18. The wireless communication device of claim 17, wherein the selected at least one individual matching network further comprises a quarterwave line.

19. The wireless communication device of claim 17, wherein the selected at least one individual matching network comprises a matching element shunted to ground, or connected in series between one of the at least two filter circuits and the multi-state switch.

* * * * *